Patented Dec. 7, 1937

2,101,251

UNITED STATES PATENT OFFICE 2,101,251

PIGMENTING FIBROUS MATERIALS

Ernst Götte and Walter Kling, Chemnitz, Germany, assignors, by mesne assignments, to Böhme Fettchemie - Gesellschaft mit beschrankter Haftung, Chemnitz, Germany No Drawing. Application June 30, 1934, Serial No. 733,332. In Germany July 1, 1933

14 Claims. (Cl. 8—20)

This invention relates to the application or deposition of pigments upon fibrous materials and more especially to the problem of giving a dull appearance to artificial silk.

In accordance with prior practice, the sheen of normal or untreated artificial silk has been avoided by producing pigments within the spinning solution or upon the spun fibers by means of chemical reactions and precipitations for example, by forming insoluble barium sulfate through the action of soluble sulfates or sulfuric acid upon soluble barium salts. All of these already known processes have the disadvantage that the pigments dust off from the surface of the fibers or, are removed by washing or laundering of the wearing apparel or other merchandise thus treated. Furthermore, these processes are not suitable for or capable of giving a permanent dull surface to dyed merchandise because the pigments proposed and used for dulling purposes have been white, with the result that the fabric thus treated due to its dark color beneath the film of white pigment has the appearance of being covered with powder.

A principal object of the present invention is to provide a method of dulling the surface of artificial fibers with pigments in a surface coating which besides giving an excellent dulling effect also is more durable and permanent against ordinary abrasion and washing. Another important object is to provide dyed artificial silk fibers of non-lustrous appearance and free from a powdery or whitened surface.

Another object is to provide a process for dulling the surface of colored artificial silk which at the same time is also capable of imparting a finishing effect to the fabric.

A further object is to provide a method of dulling fibers which is especially economical in operation, requiring very much less pigment than prior practices.

A still further object is to impart a softness to fibrous materials simultaneously with the application of the dull appearance.

Broadly, the process of the present invention comprises applying a very finely dispersed pigment, which may be either white or colored, while adsorbed or absorbed in an electro-neutral compound produced by the reaction of two oppositely charging emulsifying agents.

In carrying out the process, the pigment is made into a paste with water with the aid of negatively charged emulsifying agent, and of heat if so desired. The resulting turbid solution is well stirred and a quantity of a positively charging emulsifying agent equivalent to the quantity of the negatively charging emulsifying agent is added. This mixture is then thoroughly stirred until the electro-neutral compound formed, which has "sorbed" the pigment, flocculates and settles into the bottom of the solution. After the mass has stood for a while, a clear solution separates at the surface and can be decanted off from the precipitated particles. If precisely equal quantities of the two emulsifying agents have been employed, the remaining solution does not any longer have a tendency to foam. If so desired, the reverse order of application of the emulsifying agents may be employed, in which case the positively charging emulsifying agent is used to suspend the pigment and the negatively charging emulsifying agent for the precipitation of the electro-neutral fatty composition. This composition containing the pigment and the electro-neutral fat substance may then very easily be peptized by mixing the same with water containing a quantity of either the positive or the negative component employed in the production of the electro-neutral compound. The peptization of the dullness yielding mass by the use of the electro-positive emulsifying agent is of a particularly practical importance because the suspensions thereby produced are adsorbed or absorbed by artificial silks in the same manner as basic dyestuffs. In order to prevent the finished paste from drying, a small quantity of a hygroscopic substance, such as glycerine, may be added with advantage to the solution of the electro-positive emulsifying agent. For the peptization of the pigment-containing neutral composition, it is best but not necessary to use the same quantity of the positively charging emulsifying agent as was used in the manufacture of electro-neutral compound. Other positively charging emulsifying agents may be employed.

The pigments suitable for use in accordance with the present invention are quite varied in nature and include both white and colored substances. As white pigments there may be mentioned of particular importance the oxides or hydroxides of magnesium, zinc, tin, titanium, barium, aluminum, and of various other metals. Many salts of these metals, for example, their resinates and sulfides may be employed. The colored pigments suitable include, as examples, iron oxides, very finely dispersed carbon, the known mineral dyes, and insoluble organic dyes, such as the vat dyes.

The negatively charging emulsifying agents suitable for the practice of the present invention are also of a most varied nature. The most satisfactory compounds are the fatty alcohol sulfonates and in particular the sodium salts of the sulfuric acid esters of the aliphatic alcohols having from eight to twelve carbon atoms. Other higher molecular fatty alcohol sulfonates, as oleyl, hexadecyl, and stearyl alcohol sulfonates, are also excellently adapted for the present purpose. Of a somewhat less value are the fatty acid esters with oxysulfonic acids. Soap may also be employed, but its use is not completely satisfactory for a small amount of separation of free fatty acid cannot be avoided due to the weakly acid reaction of the dullness yielding mass. Furthermore, Turkey red oils may be employed but they, too, are not completely satisfactory.

The above mentioned new synthetic emulsifying agents, specifically the fatty alcohol sulfonates, are of extreme importance in the process of the present invention, for they have the property of simultaneously finishing effectively the fabric treated therewith while giving the fabric a dull appearance whereby the usual final treatment for accomplishing the softening effect can be entirely omitted. If, however, Turkey red oils are employed for the production of the electro-neutral dulling composition, a final softening operation has been found necessary in most cases.

As electro-positively charging emulsifying agents, the quaternary ammonium salts possessing one or more high molecular aliphatic radicals are suitable especially since they may be manufactured in a very simple manner. It is quite simple to manufacture the quaternary compounds using heterocyclic nitrogen bases, for example, pyridine, chinoline and their homologues. An excellently suitable compound is, for instance, the quaternary ammonium salt produced by the reaction of a commercial mixture of pyridine bases with dodecyl sulphuric acid esters at an elevated temperature.

*Example*

About four hundred grams of zinc sulphide are mixed with one hundred cc. of a solution of cocoanut oil fatty alcohol sulphonates of 30% strength, calculated on free alcohol. After the resulting emulsion is thoroughly mixed, a solution of 64 grams of the quaternary ammonium salts derived from dodecyl sulphuric esters and a commercial mixture of pyridine bases is introduced. The mass is then stirred until the electro-neutral compound formed has precipitated. After the precipitate has been separated from the clear solution, the former is peptized by adding a solution containing 64 grams of the above quaternary salt and 250 cc. of glycerine. The finished paste contains about 300 cc. of water in addition to the above ingredients. The quantities of materials above given may be varied within very wide limits; for example, the quantities of the two emulsifying agents may be cut in half. By lessening the proportions, the degree of softness imparted to the treated fibrous material is somewhat lessened.

The electro-neutral compositions containing the pigment as produced by the process of the present invention do not present any difficulties of application to fibrous materials, for example, the compositions can be stirred into a paste in cold water and when diluted will yield very stable suspensions.

As hereinbefore stated, one of the features of the present invention is its economical application. Whereas, the heretofore known processes require from ten to twenty grams or more of pigment per liter of solution in order to achieve a sufficient dullness, the present invention requires only two grams per liter to accomplish the same degree of dullness. The invention is not limited to such small proportions however, for if a greater intensity of dullness is desired, as much as ten grams of pigment per liter of solution may be effectively employed without any risk of imparting a powdery appearance to the merchandise treated. Thus the compositions of the invention are not only distinguished by their outstanding capacity to impart dullness and simultaneously to effect a finishing, but also by their especially economical application. For the first time the problem of giving a dull surface to artificial silks which at the present time is exceedingly important to the trades is solved in a fully satisfactory way by the process and products described herein.

It should be understood that the specific examples are given by way of illustration and that the invention contemplates other procedures and materials which would occur to those skilled in the art and that the appended claims are to be interpreted with this idea in mind.

Other positively charged emulsifying agents which can be employed instead of the quaternary ammonium compounds are higher alkyl and aryl derivatives of isourea and isothiourea, the so-called sapamines, quaternary phosphonium compounds and ternary sulfonium compounds, all these compounds containing at least one alkyl radical with at least 8 carbon atoms and similar compounds.

We claim:

1. The process of pigmenting fibrous materials comprising applying to such materials a pigment sorbed by an electro-neutral composition composed of a positively charging organic emulsifying agent containing at least one alkyl radical having at least eight carbon atoms and a negatively charging organic emulsifying agent containing an aliphatic radical having at least eight carbon atoms.

2. A process for dulling the surface of artificial fibers comprising depositing upon the surface of said fibers a pigment sorbed by an electro-neutral composition composed of a positively charging organic emulsifying agent containing at least one alkyl radical having at least eight carbon atoms and a negatively charging organic emulsifying agent containing an aliphatic radical having at least eight carbon atoms.

3. A process for dulling the surface of artificial fibers comprising treating said fibers with a suspension of a pigment sorbed by an electro-neutral fatty substance derived by mixing equivalent quantities of solutions of a positively charging organic emulsifying agent containing at least one alkyl radical having at least eight carbon atoms and a negatively charging organic emulsifying agent containing an aliphatic radical having at least eight carbon atoms.

4. The process of pigmenting fibrous materials comprising, emulsifying a suitable pigment with a solution of an electrically charging organic emulsifying agent, mixing therewith an oppositely charging organic emulsifying agent thereby forming a precipitate of an electro-neutral fatty substance containing the pigment, peptizing the precipitate and forming a suspension thereof in water using a small ratio of precipitate with respect to the water and treating the fibrous material therewith to form a deposit on its surfaces, said agents containing at least one alkyl radical having at least eight carbon atoms.

5. The process as described in claim 4, wherein the precipitate is peptized with a positively charging organic emulsifying agent.

6. The process of pigmenting fibrous materials comprising, applying to such material a pigment sorbed in an electro-neutral composition composed of a negatively charging fatty acid derivative emulsifying agent containing an aliphatic radical having at least eight carbon atoms and a positively charging organic emulsifying agent containing at least one alkyl radical having at least eight carbon atoms.

7. The process of pigmenting fibrous materials comprising, applying to such material a pigment sorbed in an electro-neutral composition composed of a negatively charging fatty acid derivative emulsifying agent and a positively charging quaternary ammonium salt containing a higher molecular aliphatic radical of at least eight carbon atoms.

8. The process of pigmenting fibrous materials comprising applying to such material a pigment sorbed in an electro-neutral fatty substance composed of a negatively charging organic emulsifying agent and a positively charging quaternary ammonium salt containing a higher molecular aliphatic radical.

9. A process for dulling the surface of artificial fibers comprising depositing upon the surface of said fibers a pigment sorbed by an electro-neutral composition composed of a sulfuric acid ester of a water soluble salt of a fatty alcohol having from 8 to 12 carbon atoms and a quaternary ammonium salt derived from the reaction of a pyridine base and a sulfuric acid ester of a higher molecular aliphatic alcohol.

10. A process for dulling the surface of artificial fibers comprising depositing upon the surface of said fibers zinc sulfide sorbed in an electro-neutral composition derived from sulfonated fatty alcohols of reduced cocoanut oil fatty acids and quaternary salts derived from dodecyl sulfuric acid esters and a commercial mixture of pyridine bases.

11. The process as described in claim 10, wherein the electro-neutral composition and pigment is dispersed in water with the aid of a positively charging emulsifying agent and from this suspension deposited upon the fibers.

12. The process as described in claim 1, wherein the electro-neutral composition employed contains a proportion of a higher molecular fatty alcohol of at least eight carbon atoms.

13. The process of dulling the surface of colored artificial silk fibers comprising depositing upon the surface of said fibers a colored pigment sorbed in an electro-neutral fatty substance of the class described, said pigment having been mixed with an ionized solution of an emulsifying agent and precipitated by the addition of an oppositely charging emulsifying agent to form the said electro-neutral fatty substance, each of said agents containing an alkyl radical having at least eight carbon atoms.

14. Colored artificial silk fibers having a dull surface, said fibers being coated with a colored pigment sorbed in an electro-neutral fatty substance of the class described, said pigment having been mixed with an ionized solution of an emulsifying agent and precipitated by the addition of an oppositely charging emulsifying agent to form the said electro-neutral fatty substance, each of said agents containing an alkyl radical having at least eight carbon atoms.

ERNST GÖTTE.
WALTER KLING.